W. B. HAMMOND.
APPARATUS FOR HEATING FEED WATER.
APPLICATION FILED APR. 18, 1907.
1,051,996.
Patented Feb. 4, 1913.
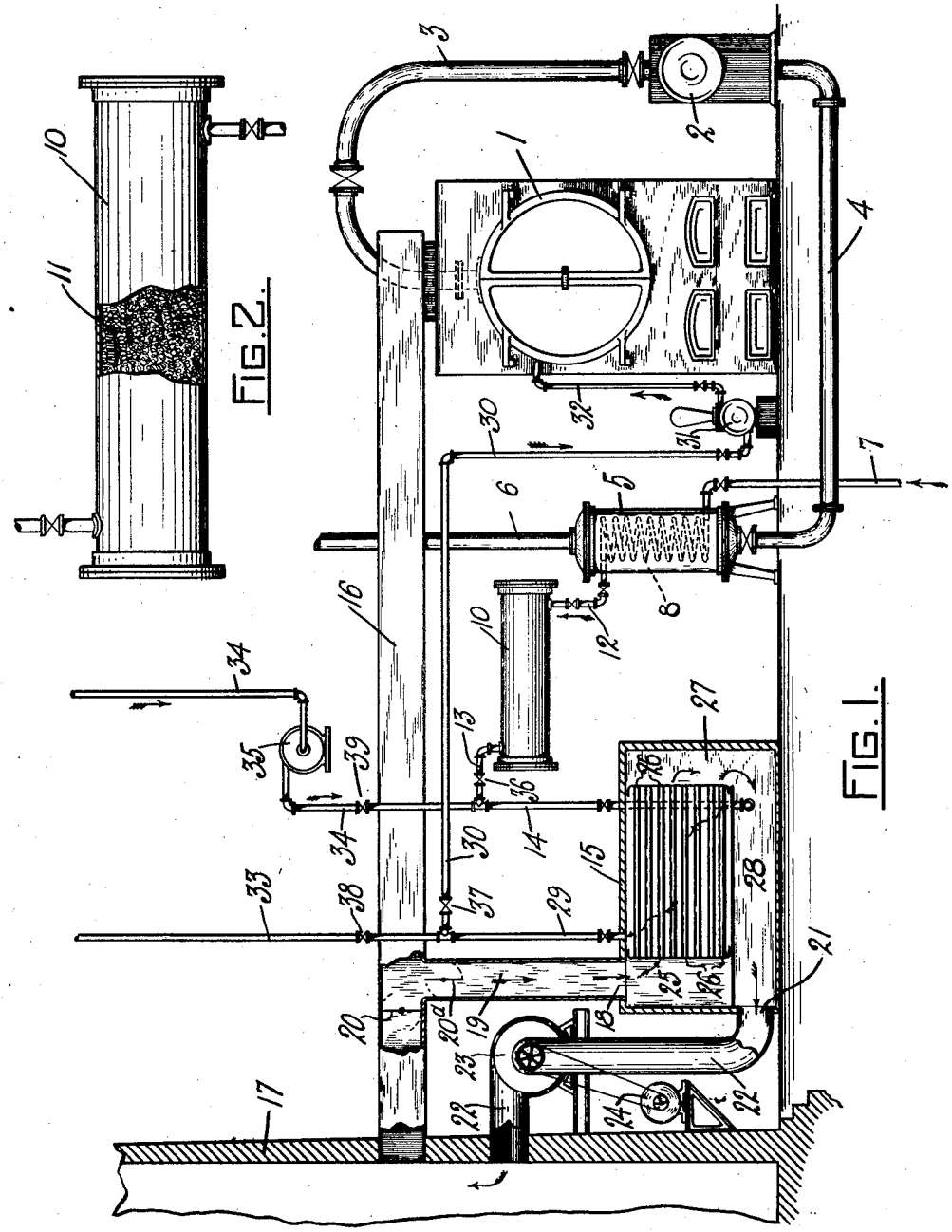
WITNESSES.
J. H. Thurston
C. G. Bradley
INVENTOR
Wilberforce B. Hammond,
By Wilmarth H. Thurston,
ATTORNEY

UNITED STATES PATENT OFFICE.

WILBERFORCE B. HAMMOND, OF BOSTON, MASSACHUSETTS, ASSIGNOR TO GENERAL FIRE EXTINGUISHER COMPANY, OF NEW YORK, N. Y., A CORPORATION OF NEW YORK.

APPARATUS FOR HEATING FEED-WATER.

1,051,996.  Specification of Letters Patent.  Patented Feb. 4, 1913.

Application filed April 18, 1907. Serial No. 368,834.

*To all whom it may concern:*

Be it known that I, WILBERFORCE B. HAMMOND, of Boston, in the county of Suffolk and State of Massachusetts, have invented certain new and useful Improvements in Apparatus for Heating Feed-Water and for other Purposes; and I do hereby declare the following specification, taken in connection with the accompanying drawings, forming a part of the same, to be a full, clear, and exact description thereof.

The invention relates to an apparatus designed primarily for heating feed-water for boilers, but which may also be employed for heating water for other purposes, as for example for the heating of a building by hot water. Heretofore an apparatus known as an economizer has been employed for thus heating feed-water by the waste products of combustion, but such economizers as heretofore constructed have been very expensive affairs, and frequently more expensive than the boiler, in connection with which they were to be employed. Thus such an economizer consisted of a large cast iron structure with various adjuncts and appurtenances, including among other things complicated devices for scraping and cleaning the tubes or sections. Such economizers also required to be bricked up, and so that, in addition to the cost of the structure itself, the cost of setting and bricking up the same was likewise very great. By reason of the large cost of such economizers the use of the same has been comparatively limited.

The object of the invention is to provide means for heating feed-water by the waste products of combustion, which shall be much less expensive both to install and to operate than the economizers heretofore employed.

To that end the invention consists primarily in the adaptation of a boiler for use as an economizer for heating feed-water, which boiler for use as such economizer may be one which has been discarded for steam generating purposes and may be without the furnace or fire-box portion thereof.

It is well-known that when water is heated the air contained therein is liberated from the water, and, as is also well understood, the oxygen of this escaping air attacks wrought iron and quickly rusts and disintegrates the same, although it does not have this effect upon cast iron. As is further understood, such liberation of the air takes place only in the case of fresh cold water, that is, if the water is kept hot after the air has once been liberated therefrom, it will have no injurious effect upon wrought iron, whereas if the water is allowed to cool, it again absorbs a certain quantity of air which when the water is again heated is liberated therefrom and so that the oxygen of such escaping air will attack any wrought iron with which it comes in contact. While, therefore, for the purpose of heating water for a hot water heating system for example, in which the water is kept hot, and in which the same water is circulated through the system over and over again, a wrought iron boiler when adapted for use as an economizer, may be employed for that purpose without difficulty. In the case of heating feed-water, however, where fresh cold water is continually passed through the economizer, a wrought iron boiler could not, for the reasons above stated, be employed as an economizer, when otherwise adapted for that purpose, without the provision of some means for preventing the oxygen escaping from the fresh cold water from attacking such wrought iron boiler. It is for this reason that it has heretofore been necessary to construct economizers of cast iron and to make use of brass pipes in connection therewith.

Another object of the invention, therefore, is to provide means whereby a wrought iron boiler, when adapted for use as an economizer, may be employed for that purpose without injury thereto from escaping oxygen.

It has been heretofore discovered as a matter of science that if heated water is passed through a chamber or receptacle containing a quantity of wrought iron, the oxygen of the escaping air will attack and expend itself upon such wrought iron contained in said chamber, and so that after the water has passed through said chamber it will be practically freed from escaping oxygen.

The invention further involves the practical application of this scientific principle, and to that end the invention further consists in the combination, with a wrought iron boiler when adapted for use as an economizer, of a chamber or receptacle containing wrought iron, preferably in the form of chips or scrap, and which for convenience I will call a "filter," and in passing the water, previously heated by some suitable means, as for instance by a feed-water heater, through such filter before it enters the wrought iron boiler or economizer.

Where an economizer is employed for heating feed-water, it is frequently found to be more economical or otherwise more desirable to make use of such economizer during the winter time for heating the water for a hot-water heating system, instead of for heating feed-water.

The invention therefore further consists in the combination, with such economizer, of suitable connections between said economizer and the steam generating boiler, and between said economizer and the circuit of a hot-water heating system whereby such economizer may be employed during warm weather for heating feed-water, and may then be employed during cold weather for heating the hot-water circuit.

The invention further consists in the combinations and arrangements of parts hereinafter described and claimed.

Referring to the drawings, Figure 1 is an elevation partly in section of an apparatus embodying the invention, and Fig. 2 is an elevation on an enlarged scale and partly in section of the filter.

1 represents a steam-generating boiler, and 2 a steam-engine operated therefrom, 3 being the steam-pipe leading from said boiler to said engine, and 4 being the exhaust-pipe from said engine. The exhaust-pipe 4 is connected to a feed-water heater 5, from which the exhaust steam is taken away through the pipe 6.

7 is a pipe through which the feed-water is led to the feed-water heater 5, said pipe being connected to a coil 8 in said heater.

10 represents the filter, which comprises a chamber or receptacle, which may be of any desired form, but which is preferably cylindrical, as shown, and which contains a quantity of wrought iron, preferably a loose mass of wrought iron chips or scrap, as indicated at 11, Fig. 2. A pipe 12 connects the coil 8 in the feed-water heater with one end of said filter, and the other end of said filter is connected by pipes 13, 14, with the water-space of the economizer 15. Said economizer consists of a wrought iron boiler which has been adapted for use as an economizer, and which is shown as being without the fire-box portion.

16 represents the flue or smoke-pipe leading from the boiler 1. Said flue is connected to and opens into the chimney 17.

In order to adapt a boiler for use as an economizer it is necessary to provide such boiler with a flue leading thereto, in addition to the usual flue leading therefrom.

18 is the additional flue provided in order to adapt the boiler 15 for use as an economizer, and 19 is a branch flue which leads from the flue 16 and connects said last mentioned flue with said flue 18. A damper 20 is arranged in the flue 16 beyond the point at which the flue 19 leads therefrom, and a damper 20ª is placed in said flue 19. In the drawings the damper 20 is shown closed and the damper 20ª is shown as open.

Leading from the exit flue 21 of the economizer is a flue 22, which leads to and opens into the chimney 17. As the tubes or flues within the economizer are of comparatively small area in cross section, there is a liability that they may become more or less filled or clogged with deposits from the products of combustion, unless means be provided to prevent it. For the purpose of increasing the draft through the tubes or flues of the economizer and to prevent clogging of the same, an exhaust fan 23 is connected with the flue 22. Said fan may be operated by any suitable means, as for example by a motor 24 belted directly thereto.

As shown in the drawings, the entrance flue 18 is at the top of the economizer 15 at or near one end thereof, and the exit-flue 21 is at the bottom of said economizer at or near the same end. With this construction the products of combustion from the boiler 1 are led through the entrance flue 18 into the chamber 25 at one end of the economizer, and thence into one end of the tubes or flues 26 within the economizer, and pass through the same into the chamber 27 at the other end of the economizer, and thence back through the return flue 28 to the exit flue 21, and thence to the flue 22. The products of combustion are therefore caused to travel twice the entire length of the economizer, thereby materially increasing the heating capacity of said economizer.

A pipe 29 leads from the water-space of the economizer 15, said pipe 29 connecting with a pipe 30 leading to the pump 31, from which pump a pipe 32 leads to the boiler 1. Each of the pipes heretofore referred to is provided with a suitable valve or valves for controlling the flow therethrough, as shown in the drawings. Preferably the outlet-pipe 29 is connected with the top of the economizer, and the inlet-pipe 14 is connected with the bottom thereof, as shown.

The operation of the apparatus above described will be readily understood. The feed-water entering through the pipe 7 will pass through the coil 8 of the feed-water heater 5, where it will be heated by exhaust-steam from the engine 2 to a sufficient extent to cause the air contained in the water to be liberated therefrom, and so that when the water so heated enters the filter 10, the escaping oxygen will attack and expend itself upon the wrought iron chips or scrap contained in said filter. By properly proportioning the size of the filter 10 and the quantity of wrought iron therein to the quantity of feed-water which is to be passed therethrough, the effect of passing the feed-water through said filter will be that the feed-water after it has passed through said filter will be practically free from escaping oxygen, and so that there will be no such escaping oxygen to attack or injure the wrought iron economizer or the pipes leading thereto. The water as it comes from the filter 10 will be carried through the pipes 13 and 14 to and through the water-space of the economizer 15, and will be there heated by the products of combustion from the boiler 1, said products of combustion passing through the chamber 25, flues 26, chamber 27 and return-flue 28. While the economizer is in use the damper 20 will be closed and the damper 21 open, as shown. When the economizer is not in use, the damper 20 will be opened and the damper 8 closed, and so that the products of combustion will be carried directly to the chimney through the flue 16. In order that the economizer 15 may, if desired, be employed in the winter time to heat the water for a hot-water heating system, instead of for heating feed-water, said economizer may be connected with the circuit-pipes of a hot-water heating system, and it is shown in the drawings as so connected. Connected to the pipe 29 is a pipe 33 which leads to and constitutes the outflow pipe for the hot water heating circuit, while the return-pipe 34 of said circuit is connected with the pipe 14. Preferably a pump 35 is arranged in said hot-water circuit for maintaining a forced circulation therein. The pipe 13 is provided with a valve 36, the pipe 30 with a valve 37, the pipe 33 with a valve 38 and the pipe 34 with a valve 39. If the economizer is to be used for heating feed-water the valves 36 and 37 will be opened and the valves 38 and 39 will be closed. If the economizer is to be used for heating the hot-water heating circuit, the valves 36 and 37 will be closed and the valves 38 and 39 will be opened.

It will be seen that by thus adapting a boiler for use as an economizer, and which boiler may, as above stated, be one which has been discarded for steam generating purposes, an economizer is provided for heating water by the products of combustion from a boiler or furnace used for other purposes, which will be much less expensive, both to install and to operate, than economizers such as heretofore employed, and which will at the same time be thoroughly efficient and reliable.

It will be further understood that, by the employment of a filter of the character described, a wrought iron boiler may be adapted for use and may be employed as an economizer for heating feed-water without liability of being injured or damaged by the escaping oxygen of the heated water.

It will be further understood that instead of adapting an old wrought iron boiler for use as an economizer, a specially constructed wrought iron structure provided with a suitable water-space and with suitable flues for the passage of the products of combustion may be employed. It is ordinarily preferred, however, to employ an old and discarded wrought iron boiler when such a boiler is available, as the cost thereof would ordinarily be much less than that of an economizer made specially for the purpose. As will be understood, the reason why an old discarded boiler may be adapted and used as an economizer is because no steam is generated therein, and the only pressure, therefore, which it is called upon to withstand is the pressure of the water flowing therethrough. When the economizer is used for heating feed-water, the pump 31 operates to force the water from the economizer into the boiler against the pressure therein. While it is preferred to employ as such economizer a boiler or similar iron structure which is provided with tubes or flues within the structure for the passage of the products of combustion, and with a water-space surrounding said tubes, a boiler or similar wrought iron structure may be employed which is provided with tubes for the passage of the water, and in which the products of combustion pass through a space surrounding said tubes. There is an important advantage, however, in employing a boiler or similar structure provided with tubes or flues within the structure for the passage of the products of combustion, for the reason that a much stronger draft can be induced and maintained therethrough by the exhaust fan employed in combination with the economizer, it having been found in practice that a draft may be maintained which is sufficient to practically keep the tubes or flues free from deposits and to avoid the necessity for otherwise cleaning the same, except at comparatively long intervals.

The employment of an exhaust fan in combination with the economizer will not only provide an induced circulation of the products of combustion through said economizer, but will also serve to prevent the accumulation of deposits therein and the resulting clogging of the flues, thereby doing away with the complicated and troublesome devices required to be used for cleaning the flues of economizers as heretofore employed. While the economizer may, if desired, be bricked up, it is not necessary that this should be done. When the water-space of the economizer is also connected with the hot-water heating circuit, as shown in the drawings, it will be understood that the economizer may be employed during warm weather for heating feed-water, and may then be employed during cold weather for heating the water for a hot-water heating system, which arrangement has been found in practice to be a very economical and advantageous one.

It will be understood that when the economizer is to be employed, both for heating feed-water and for heating water for some other purpose, such for example as for hot-water heating, the economizer may be provided with two separate and independent water-spaces, through one of which the feed-water is passed and through the other of which the other water to be heated is passed.

With such construction the economizer may continue to be used for heating feed-water at the same time that it is used for heating water for some other purpose. This same result may be obtained by employing two economizers and connecting them up in such a way that at one time both economizers may be used for heating feed-water, and then at another time one of the economizers may be used for heating feed-water, and the other economizer may be used for hot-water heating or for such other purpose as may be desired.

What I claim as my invention and desire to secure by Letters Patent is:

1. The combination of an economizer consisting of a wrought iron structure and a chamber containing wrought iron through which the water to be heated by the economizer passes on its way to said economizer.

2. The combination of an economizer consisting of a wrought iron structure, a chamber containing wrought iron through which the water to be heated by the economizer passes on its way to said economizer, and means for preliminarily heating the water before it passes into said chamber.

3. The combination, with a steam-generating boiler, of an economizer for heating feed-water for said boiler, said economizer consisting of a wrought iron structure, and a chamber containing wrought iron through which the feed-water passes on its way to said economizer.

4. The combination, with a steam-generating boiler, of an economizer for heating feed-water for said boiler consisting of a wrought iron structure, and adapted to be heated by the products of combustion from said boiler, a chamber containing wrought iron through which said feed-water passes on its way to said economizer, and a pump for forcing said feed-water into said boiler.

5. The combination, with a steam-generating boiler, of an economizer for heating feed-water for said boiler consisting of a wrought iron structure and adapted to be heated by the products of combustion from said boiler, a chamber containing wrought iron through which said feed-water passes on its way to said economizer, means for preliminarily heating said feed-water before it passes into said chamber, and a pump for forcing said feed-water into said boiler.

6. The combination, with a steam-generating boiler, of an economizer for heating feed-water for said boiler consisting of a wrought iron structure and adapted to be heated by the products of combustion from said boiler, a chamber containing wrought iron through which said feed-water passes on its way to said economizer, a steam-using device supplied by steam from said boiler, and a heater adapted to be heated by exhaust steam from said steam-using device for preliminarily heating said feed-water before it passes into said chamber.

WILBERFORCE B. HAMMOND.

Witnesses:
W. H. THURSTON,
J. H. THURSTON.